(12) United States Patent
Necaise

(10) Patent No.: US 6,398,311 B1
(45) Date of Patent: Jun. 4, 2002

(54) CUSTOM WHEEL ASSEMBLY

(76) Inventor: Ronnie Necaise, 10552 Sentinel, San Antonio, TX (US) 78209

( * ) Notice: Subject to any disclaimer, the term of this patent is extended or adjusted under 35 U.S.C. 154(b) by 0 days.

(21) Appl. No.: 09/672,425

(22) Filed: Sep. 28, 2000

(51) Int. Cl.[7] .............................. B60B 25/00; B60B 7/14
(52) U.S. Cl. .............................. 301/35.62; 301/37.371; 301/108.4
(58) Field of Search .............................. 301/37.1, 37.37, 301/37.38, 105.1, 108.1, 108.4, 35.622, 108.5, 37.371, 37.21, 35.62

(56) References Cited

U.S. PATENT DOCUMENTS

| | | | | |
|---|---|---|---|---|
| 4,478,458 A | * | 10/1984 | Flexman | 301/37.1 |
| 4,881,783 A | * | 11/1989 | Campbell | 301/108.1 |
| RE33,806 E | * | 1/1992 | Wang et al. | 301/37.1 |
| 5,150,949 A | * | 9/1992 | Wang | 301/37.1 |
| 5,152,584 A | * | 10/1992 | Maxwell, Jr. | 301/37.1 |
| 5,464,277 A | * | 11/1995 | Redd | 301/108.4 |
| 5,542,750 A | * | 8/1996 | FitzGerald | 301/37.37 |
| 5,584,537 A | * | 12/1996 | Miansian | 301/105.1 |
| 5,820,224 A | * | 10/1998 | Dimatteo, Jr. | 301/105.1 |
| 5,853,228 A | * | 12/1998 | Patti et al. | 301/37.37 |
| 5,876,099 A | * | 3/1999 | Irgens-Moller et al. | 301/108.4 |

* cited by examiner

*Primary Examiner*—S. Joseph Morano
*Assistant Examiner*—Long Bao Nguyen
(74) *Attorney, Agent, or Firm*—Gunn, Lee & Hanor, P.C.; Michelle Evans

(57) ABSTRACT

A custom wheel assembly that reduces and/or eliminates vibration of vehicles that utilize custom wheels. This is accomplished through the use of a hub ring that is placed over the center hub of a wheel hub, but behind the wheel. This renders the wheel hub-centric to reduce and/or eliminate the vibration. The hub ring is held in place by a center cap that fits over the center hub and attaches to the hub ring.

3 Claims, 1 Drawing Sheet

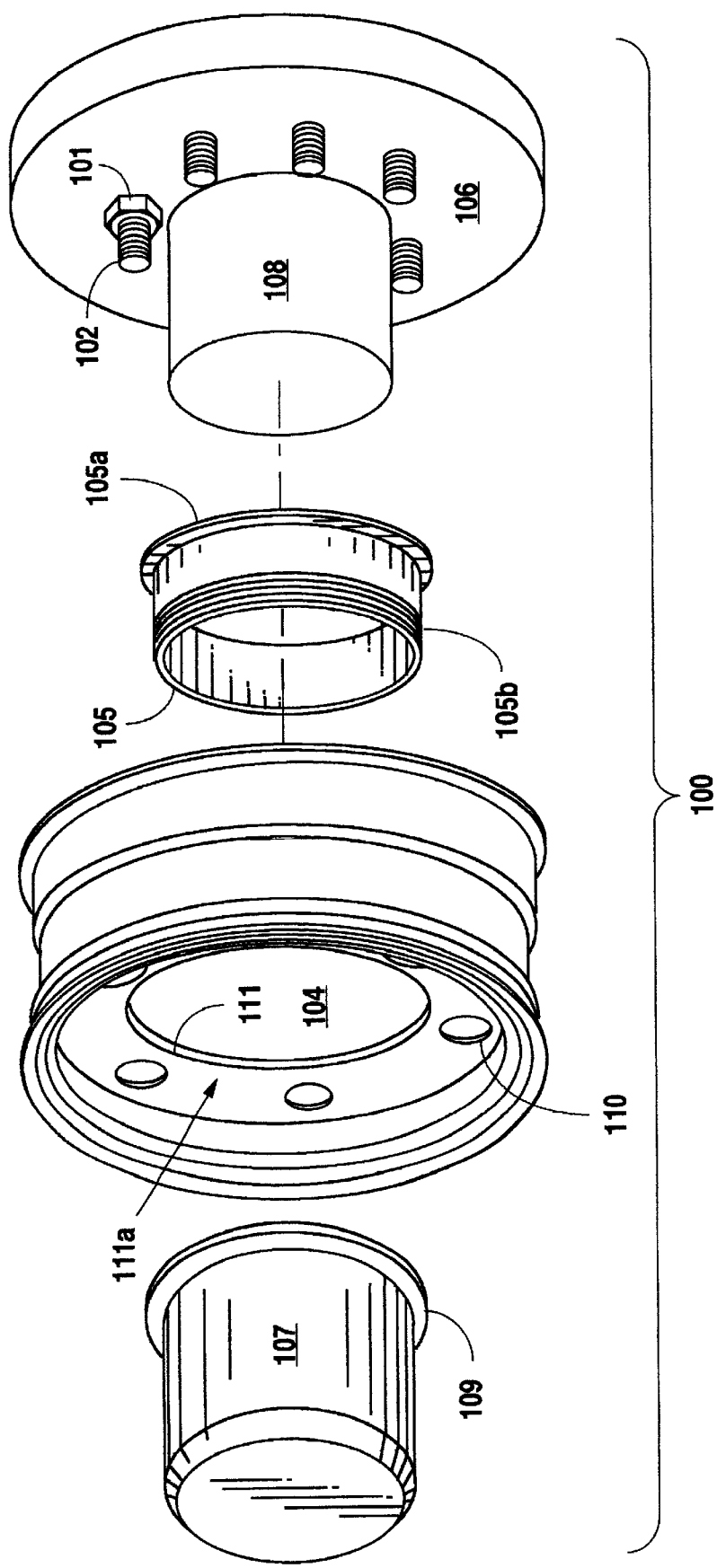

CUSTOM WHEEL ASSEMBLY

BACKGROUND OF THE INVENTION

1. Field of The Invention

Applicant's invention relates to custom wheels and more particularly a custom wheel assembly that incorporates a hub ring for reduction and/or elimination of vibration in vehicles that utilize custom wheels.

2. Background Information

Nowadays, there is a general trend among vehicle owners to make their vehicles more attractive by the addition of custom wheels. Unfortunately, not only are custom wheels expensive, custom wheels currently available do not fit appropriately with the wheel hub of the vehicle which causes unnecessary vibration of the vehicle when the vehicle is in motion. This vibration can cause discomfort for the occupants of the vehicle to the extent that such comfort concerns may outweigh the vehicle owner's desire to have a more attractive vehicle.

There are custom wheel assemblies known in the prior art in U.S. Pat. No. 5,152,584 issued to Maxwell Jr., U.S. Pat. No. 5,464,277 issued to Redd, and U.S. Pat. No. 5,876,099 issued to Irgens-Moller, et al, but none appear to be constructed to reduce and/or eliminate the unnecessary vibration caused by the application of the custom wheels. The present invention has advantages over the prior art in that it provides for a custom wheel assembly that does not cause unnecessary vibration of the vehicle. In addition, the present invention can be adapted for use with existing custom wheel assemblies. This benefit is accomplished through the use of a hub ring which is placed on top of the center hub of a wheel hub, but behind the wheel. This renders the wheel hub centric, unlike the prior art, and therefore no and/or reduced vibration is experienced. The hub ring of the present invention is particularly designed to work in coordination with the custom wheel assembly of the present invention and can be adapted for use with all vehicles and wheel hub types. In addition, with obvious modifications the hub ring can be adapted to conform to any known or obvious custom wheel assemblies as well as any newly developed vehicles and wheel hub types.

SUMMARY OF THE INVENTION

It is an object of the present invention to provide a novel custom wheel assembly.

It is another object of the present invention to provide a novel custom wheel assembly that minimizes and/or eliminates vibration.

Still another object of the present invention is to provide a novel custom wheel assembly that incorporates a hub ring to minimize and/or eliminate vibration.

It is yet another object of the present invention to provide a novel custom wheel assembly that incorporates a hub ring that is placed behind the wheel to render the wheel hub centric on the vehicle.

Another object of the present invention is to provide a novel custom wheel assembly that incorporates a hub ring placed between the wheel and wheel hub to render the wheel hub-centric on the vehicle.

Still another object of the present invention is to provide a center cap that frictionally attaches to the ring to hold the ring in place.

In satisfaction of these and related objectives, Applicant's present invention provides a custom wheel assembly that incorporates a hub ring for reduction and/or elimination of vibration in vehicles that utilize custom wheels.

BRIEF DESCRIPTION OF THE DRAWINGS

FIG. 1 is an exploded view of the preferred embodiment of the present invention.

DETAILED DESCRIPTION OF THE PREFERRED EMBODIMENT

In FIG. 1, an exploded view of the preferred embodiment of the present invention is shown. There is shown a vehicle wheel assembly 100 having a vehicle wheel hub 106, being circular and of appropriate dimensions and of appropriate material for the vehicle of interest, with a plurality of lugs 102 and an equal amount of lug nuts 101. The lugs 102 are preferably spaced equally apart in a circle around the center of vehicle wheel hub 106 with lug nuts 101 placed thereon. A hub ring 105 is placed over a center hub 108 located at the center of vehicle wheel hub 106. The hub ring 105 is made from a material suitable for its purpose and of appropriate dimensions for the vehicle of interest which can vary with hub manufacturer and hub size. The hub ring 105 has a material thickness suitable for the vehicle of interest and is preferably threaded at a first side 105b having preferably a first lip 105a that preferably lays flat against vehicle wheel hub 106 with a radius lip portion (not shown) fitting into the wheel 111 to hold ring 105 in place. The threads of hub ring 105 extend preferably approximately ½ inch from first side 105b.

The first side 105b of said hub ring 105 is inserted into the central bore 104 of a first side 111a of a wheel 111. The wheel 111 is conventional for the make and model of the applicable vehicle and contains a plurality of openings 110 for accessing air to the brake drums. Central bore 104 of the wheel 111 has preferably a diameter of between approximately 70 mm and 110 mm. This insertion of hub ring 105 into central bore 104 renders the wheel 111 hub-centric on the vehicle. The threaded portion of the hub ring 105 will protrude through the wheel 111 and out of the central bore 104 of the wheel 111 allowing for a center cap 107 to be installed over the center hub 108. Center cap 107 is of appropriate dimension to be placed over center hub 108 to complete the custom wheel assembly 100. Center cap 107 is preferably threaded inside and frictionally attaches, but preferably screws onto the threaded portion of hub ring 105. The hub ring 105 and the center cap 107 are threaded in the appropriate direction to permit tightening of the assembly each time the vehicle is in motion. The inside diameter of center cap 107 varies according to the make and model of the vehicle. Center cap 107 is preferably made from aluminum or plastic, but may be made from any suitable material. Once center cap 107 is in place, second lip 109 lays flat against wheel 111. Center cap 107 is held in place preferably with a screw, and most preferably with a black torx headed set screw. The center cap 107 may contain indicia and/or design elements for various custom wheel assemblies. The present invention is preferably used with wheels having exposed lugs. While each part has been discussed separately, it is understood that many if not all of the parts described herein can be attached prior to assembly to other parts described herein and would be considered obvious to those skilled in the art.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A custom wheel assembly to reduce vibration of a vehicle utilizing custom wheels comprising:
   a wheel hub having a plurality of equispaced lugs with lug nuts thereon;
   a ring having a lip at its base, wherein said lip of said ring base is placed at the center of said wheel hub inside the perimeter established by said equispaced lugs;
   a wheel through which is inserted an upper threaded portion of said ring said wheel clamping against inside said lip; and
   a domed center cap removably threaded to said upper threaded portion of said ring.

2. The custom wheel assembly of claim 1 further comprising a center hub at the center of said wheel hub.

3. The custom wheel assembly of claim 2 wherein said center cap is placed over said center hub before attachment to said ring.

* * * * *